(12) United States Patent
Riesner

(10) Patent No.: US 8,421,674 B2
(45) Date of Patent: Apr. 16, 2013

(54) LOCALIZATION SYSTEM FOR DETERMINING A POSITION OF A DEVICE THAT CAN BE MOVED ON THE FLOOR

(75) Inventor: Stefan Riesner, München (DE)

(73) Assignee: Robotics Technology Leaders GmbH, Munich (DE)

( * ) Notice: Subject to any disclaimer, the term of this patent is extended or adjusted under 35 U.S.C. 154(b) by 35 days.

(21) Appl. No.: 13/144,262

(22) PCT Filed: Jan. 19, 2010

(86) PCT No.: PCT/EP2010/000279
§ 371 (c)(1),
(2), (4) Date: Aug. 2, 2011

(87) PCT Pub. No.: WO2010/083977
PCT Pub. Date: Jul. 29, 2010

(65) Prior Publication Data
US 2011/0279325 A1    Nov. 17, 2011

(30) Foreign Application Priority Data
Jan. 20, 2009   (DE) ..................... 20 2009 000 643 U

(51) Int. Cl.
*G01S 3/02* (2006.01)

(52) U.S. Cl.
USPC .......................................... 342/457; 342/463

(58) Field of Classification Search .................. 342/453, 342/457, 463–465; 455/456.5, 457
See application file for complete search history.

(56) References Cited

U.S. PATENT DOCUMENTS
6,377,888 B1   4/2002 Olch

FOREIGN PATENT DOCUMENTS
DE   101 48 976 A1   4/2003
WO   WO 99/06898 A1   2/1999

*Primary Examiner* — Dao Phan
(74) *Attorney, Agent, or Firm* — Muncy, Geissler, Olds & Lowe, PLLC

(57) ABSTRACT

The invention relates to a localization system for determining a state of a device that can move on a floor, comprising a floor transceiver system having a plurality of floor transceivers which each have floor antennas for marking position points within the plane of the floor, and a transceiver tablet which is connected to the movable device and has a transmitting/receiving surface which is located opposite the floor and is suitable for continuously determining the position of at least two floor antennas within the transmitting/receiving surface simultaneously.

18 Claims, 4 Drawing Sheets

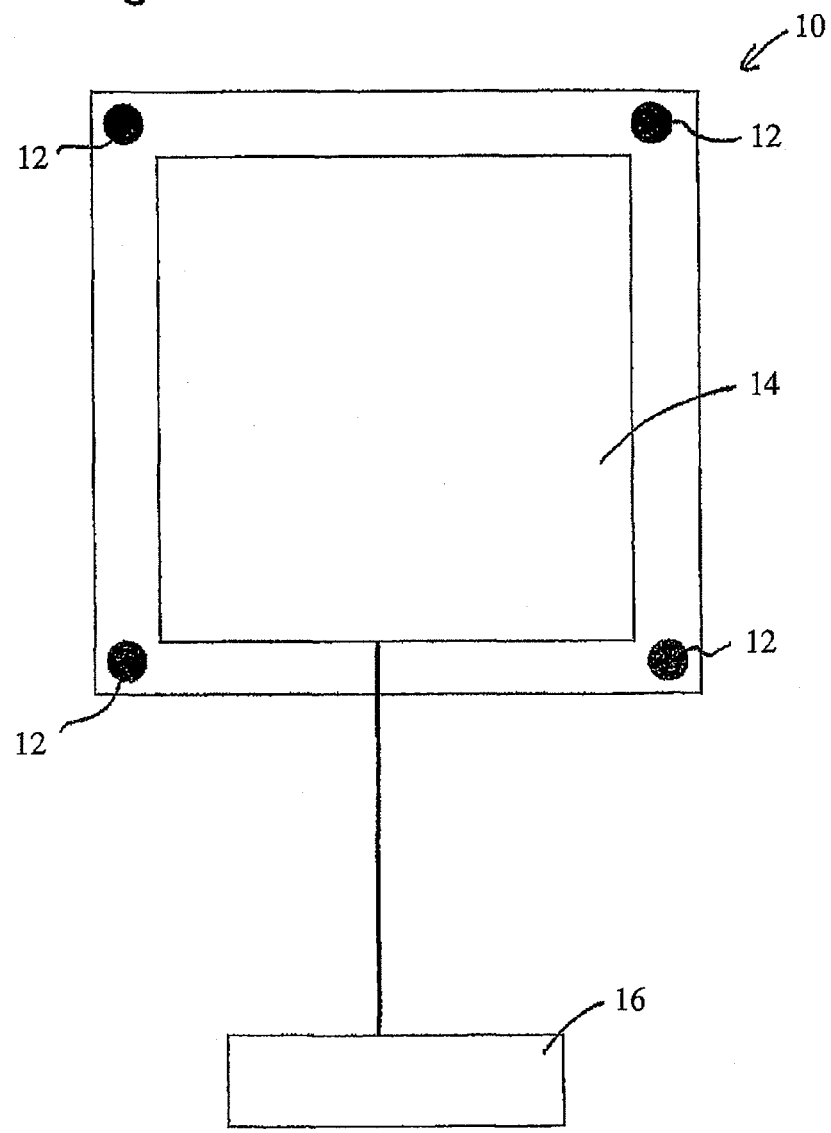

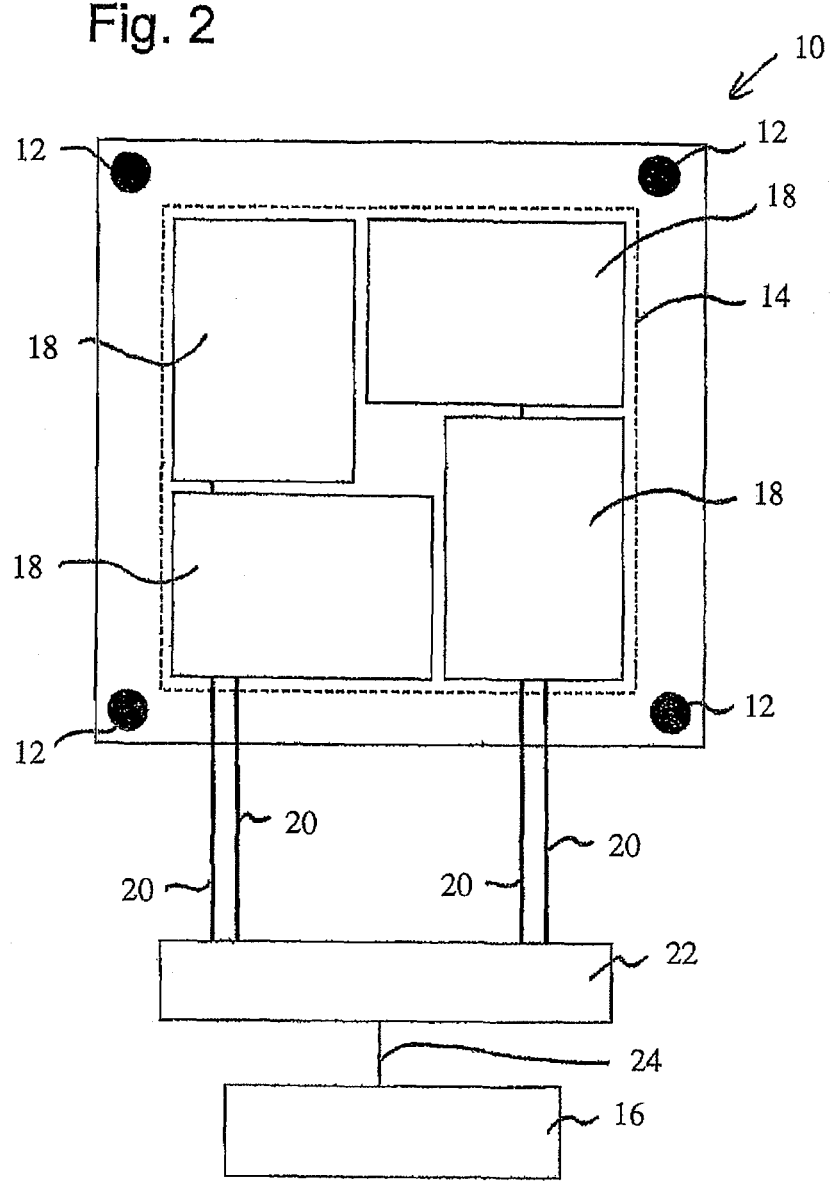

Figure 3A:
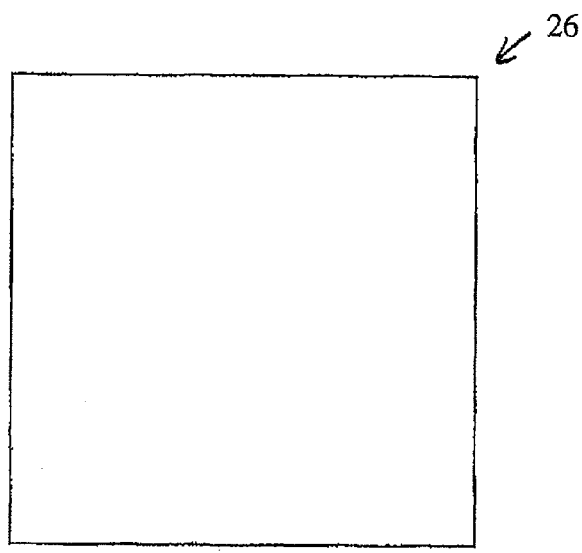

LOCALIZATION SYSTEM FOR DETERMINING A POSITION OF A DEVICE THAT CAN BE MOVED ON THE FLOOR

The invention relates to a localization system for determining a state of a device which can be moved on a floor, in particular of a movable robot for industrial applications or of a camera robot.

During the production of films and television programs, virtual worlds are often used as a backdrop for the protagonists such as actors and news readers. This technique is known, inter alia, as blue screen technology or green screen technology. In order to correctly adapt this virtual world later to the real image with appropriate perspective, it is necessary, during the recording by means of a studio camera, to know the precise position of the focal point of the studio camera and the viewing direction thereof, that is to say its attitude in space.

For this purpose, a series of passive encoded targets are usually used in a studio lighting system, which are continuously lit and captured by a small tracking camera which is mounted on the studio camera. Each target is unambiguously characterized by a circular barcode, with the use of narrow-band LEDs and reflective material ensuring that, under normal lighting conditions in the studio, a sufficient number of targets can always be seen. The image of the tracking camera is processed in order to calculate the precise position and attitude of the studio camera. The position and attitude of the studio camera can be calculated on the basis of the knowledge of the position of the targets. A commercial application of this positioning principle is, for example, the free-D system from RADAMEC Broadcast Robotics.

In a further localization system which is marketed under the product name blue.i Studio Navigator by MGS, cameras are used which have servo axes with rotary encoders, wherein the position of the individual axes can be interrogated, and therefore the position of the camera and its attitude determined, at any time. In addition, the camera is mounted on a frame which can be moved in the studio, wherein a specially configured floor is used which has a digitally encoded pattern which is read out by means of a camera which is mounted on the camera frame and is moved across the floor, as a result of which the position and relative attitude in the plane of the floor of the studio can be determined. In order to ensure that the floor pattern is read out precisely, the floor must, however, be kept free of dirt.

Furthermore, localization systems are known which use RF-ID transmitters which are introduced into the floor of a warehouse for the attitude of transportation vehicles or in a carpet for automatic vacuum cleaners, wherein the corresponding vehicle has an RF-ID antenna in order to localize the RF-ID transmitters in the floor and to receive corresponding travel instructions or attitude assistance. So that the RF-ID transmitters can be easily located in the floor, the antennas of the vehicles whose position is to be determined are as large as possible, but as a result of this the precision of the localization process is low as a result of the size of the antennas which are used.

The invention is therefore based on the object of providing a further localization system for determining a state of a device which can be moved along a floor and which has a high level of positioning accuracy and at the same time requires little maintenance.

This object is achieved by means of the localization system as claimed in claim 1. Advantageous refinements and developments of the invention are presented in the subclaims.

According to the invention, a localization system for determining a state of a device which can move or be moved on a floor is provided, comprising a floor transceiver system having a multiplicity of floor transceivers which each have floor antennas for marking position points within the plane of the floor, and a transceiver tablet which is connected to the movable device and has a transmitting/receiving surface which is located opposite the floor and is suitable for continuously determining the position of at least two floor antennas within the transmitting/receiving surface simultaneously. In this context, the term state of the movable device is to be understood as meaning the position of the movable device and its attitude or orientation in the plane of the floor.

A localization system is therefore provided in which a planar antenna arrangement is used which is mounted on a movable device and moved over a floor, wherein quasi-punctiform antenna, which can be localized by means of the planar antenna arrangement, are introduced in the plane of the floor at predetermined intervals, for example in a honeycomb arrangement. The planar antenna arrangement is configured here in such a way that it can detect the position of a punctiform antenna in the floor plane within its reception area very precisely, that is to say for example in the millimeter range. The planar antenna arrangement is configured here in such a way that it can detect at least two floor antennas simultaneously, in order therefore to be able to determine the position and attitude of the planar antenna arrangement and therefore of the movable device. In this context it is particularly advantageously if the individual floor antennas operate on the basis of induction, as a result of which an external power supply of the floor antennas is dispensed with.

For a real configuration of a floor transceiver it is expedient if a floor transceiver comprises a coil which is embodied as a floor antenna and whose winding axis is located essentially perpendicularly with respect to the plane of the floor, and an electronic circuit board which is electrically connected to the coil and is designed for RF communication with the transceiver tablet. It is therefore possible for the floor antenna to be embodied in a quasi-punctiform fashion in the plane of the floor, as a result of which position points within the plane of the floor can be marked particularly suitably.

In order to ensure that the movable device immediately knows its position and attitude without setting its original starting position, it is expedient if the electronic circuit board is suitable for transmitting a position identifier to the transceiver tablet during RF communication therewith.

In order to simply accommodate the floor transceivers within a floor, it is advantageous if the coil of a floor transceiver has a diameter of less than 5 mm and, in particular, less than 2 mm. In this context, the floor transceivers, that is to say a coil together with an electronic circuit board, can be inserted into holes which have been drilled directly into an existing floor since cabling is absent owing to the fact that power is supplied through the transceiver tablet.

In order to install the floor transceiver system in a simple way or perform simple maintenance in the event of a failure of floor transceivers, it is particularly expedient if the floor transceiver system has a plurality of floor panels, wherein the coils of the floor transceivers are each accommodated in rear-mounted blind holes of the floor panel in such a way that the distance between the surface of the floor and the end of the coil is less than 15 mm, preferably less than 10 mm and, in particular, less than 5 mm.

In this context, the floor panel is advantageously manufactured from gypsum fibers, wherein the blind holes can be formed by drilling.

For mobile use of the localization system according to the invention, it is particularly advantageous if the coil of a floor transceiver is embodied as a planar coil in a flexible floor which can be rolled out, as a result of which the floor can be easily transported. It is expedient here to select the diameter of the coils of the floor transceiver to be in the range between 50 mm and 150 mm.

In order to implement a precise localization system for a movable device, for example for a studio camera in a television studio, it is expedient if the average distance between the transmitting/receiving surface of the transceiver tablet and the plane of the floor is less than 15 mm, preferably less than 10 mm and, in particular, less than 5 mm.

In one preferred refinement of a transceiver tablet, the latter has spacer elements for keeping the transmitting/receiving surface of the transceiver tablet at a predetermined distance from the plane of the floor.

The spacer elements are expediently fabricated from plastic here, wherein said spacer elements can be easily replaced after wear.

For a simple configuration of the invention which requires the smallest possible amount of outlay on programming in terms of the localization and detection of floor antennas, it is expedient if the transceiver tablet is composed of a plurality of component tablets for detecting, in each case, one position of a floor antenna of a floor transceiver, wherein the floor antennas of the floor transceivers are arranged in the plane of the floor in such a way that, at every position of the transceiver tablet, there is always a floor antenna in the detection range of a component tablet. In this context, the transceiver tablet can advantageously have at least two component tablets.

For the use of the localization system according to the invention in a film studio, it is advantageous if the movable device is a movable camera robot or industrial robot. However, it is also conceivable here to provide a camera stand as a movable device.

The use of the localization system according to the invention in a movable industrial robot or camera robot has the particular advantage that, when a predetermined position is adopted by a camera or a hand of a robot, a movable stand of the robot is first moved to a predetermined floor position by an actuating system which is located in the movable stand, wherein the natural imprecision of the floor position which is adopted, due to the adjustment system of the movable stand, can easily be compensated by virtue of the fact that the position in the plane of the floor is determined with millimeter precision by the localization system and the imprecisely adopted standing position of the movable stand of the industrial robot or camera robot is compensated by the camera robotics, that is to say by the millimeter-precise movement of the robot's arms. It is therefore possible, by combining camera robotics and localization system, to provide a movable robot which can move a robot's hand or a film camera to a position in a space with millimeter precision.

Finally, it is advantageous if the movable device is a movable air cushion system with a robot for industrial use or a camera robot.

Figure 3B:
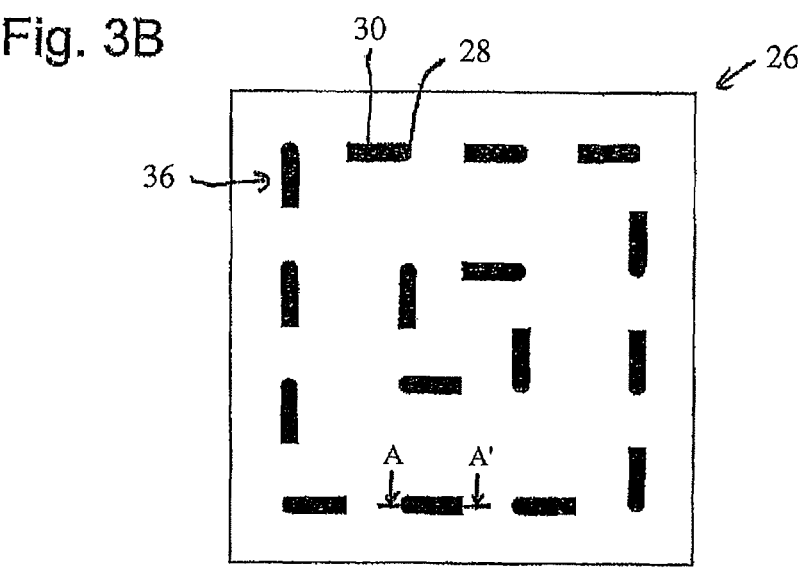
Figure 3C:
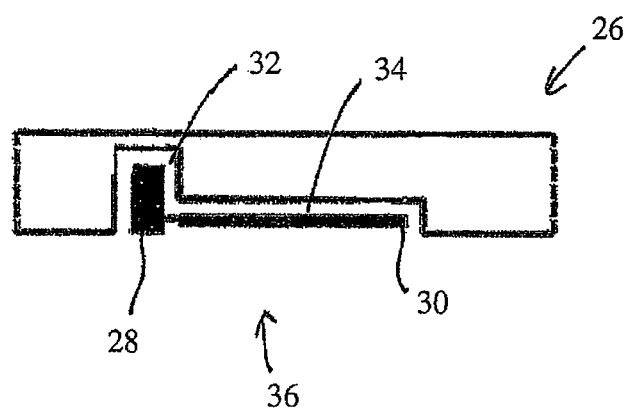

The invention will be explained in more detail below, by way of example, with reference to the drawing, in which:

FIG. 1 shows a highly simplified schematic view of a transceiver tablet according to the invention, FIG. 2 shows a highly simplified schematic view of a transceiver tablet according to an exemplary embodiment of the invention, FIG. 3A shows a simplified schematic plan view of an upper side of a floor panel of a floor transceiver system according to the invention, FIG. 3B shows a simplified schematic plan view of a rear side of the floor panel of the floor transceiver system according to the invention, and FIG. 3C shows a simplified schematic sectional view along a line A-A' in FIG. 3B of the floor panel of the floor transceiver system according to the invention.

Components which correspond to one another are provided with the same reference symbols in the various figures of the drawing.

FIG. 1 shows an exemplary embodiment of a transceiver tablet 10 of the localization system according to the invention.

The transceiver tablet 10 is provided for connection to a movable device, wherein the underside (as shown in FIG. 1) of the transceiver tablet 10 is located opposite a plane of the floor in which floor transceivers, which will be described in more detail below, are introduced. For this purpose, the transceiver tablet can have spacer elements 12 made of plastic, in order to keep the underside of the transceiver tablet 10 at a defined distance from the plane of the floor or the surface of the floor. The transceiver tablet 10 is therefore preferably moved over a plane of the floor, but it is also conceivable to provide small ball castors as spacer elements 12. The transceiver tablet 10 is attached to the movable device (not shown) in such a way that it is freely movable in the horizontal direction in order therefore to achieve continuous contact of the spacer elements 12 and of the transceiver tablet 10 with the floor. However, it is decisive here that the relative position of the transceiver tablet 10 in respect of the movable device is fixed within the plane of the floor, in order therefore to be able to precisely determine the attitude and position of the movable device by means of the position and attitude of the transceiver tablet 10. A camera robot, which is seated on a camera frame which can be moved by means of rollers, is preferably used as the movable device, but it is also conceivable to position the camera robot on a movable air cushion platform.

The transceiver tablet 10 has, on its underside, a transmitting/receiving surface 14 which is located opposite the plane of the floor at a predetermined distance and which is suitable for determining the position of at least two floor antennas. The transmitting/receiving surface 14 is connected to evaluation electronics 16 for evaluating the signals which are received by the transmitting/receiving surface 14.

FIG. 2 shows an exemplary embodiment of a transceiver tablet 10 of the localization system according to the invention. In this transceiver tablet 10, four component tablets 18, which each have transmitting/receiving surfaces and are located opposite the surface or plane of the floor at a predetermined distance, are arranged within the transmitting/receiving surface 14. The component tablets 18 are configured in such a way that they can detect the position of, in each case, one floor antenna within the tablet region of the component tablet. The component tablets 18 are connected via data lines 20, which transmit, for example, a USB protocol, to a data line node 22 which can be embodied as a USB hub. The data lines 20 which are combined by the data line node are fed to the evaluation electronics 16 via a common data line 24. The component tablets 18 can have, in addition to the transmitting/receiving surface, their own evaluation electronics, wherein the completely evaluated position of a floor antenna within the plane of the component tablet is already transmitted via the data lines 20 to the evaluation electronics 16 by means of a USB protocol. The evaluation electronics 16 may be a PC or an integrated circuit here.

FIGS. 3A to 3C show an exemplary embodiment of a floor panel 26 of a floor transceiver system according to the invention.

As is clarified in the plan view of the upper side of the floor panel 26 in FIG. 3A, the surface of the floor panel 26 of the floor transceiver system does not have any changes in contour compared to a normal floor panel, as a result of which it is possible, for example in a television studio, to coat the latter with a specific color, as is customary, for example, in the case of green screen technology. In addition, the floor transceiver system of the invention is resistant to dirt and abrasion and, moreover, very durable since all the electronic components of the floor transceiver system are protected against moisture or other effects of force by the floor panel 26.

In FIG. 3B, a plan view of an underside of the floor panel 26 of the floor transceiver system of the invention is shown. As becomes clear from FIG. 3C, which illustrates a lateral sectional view along a line A-A' in FIG. 3B, coils which are embodied as floor antennas 28 and which are each connected electrically to associated electronic circuit boards 30, are arranged in the rear side of the floor panel 26. The coils 28 are arranged in cylindrical blind holes 32 which extend to just before the surface of the floor panel 26. The electronic circuit boards 30 can each be inserted into flat rectangular recesses 34 in the rear side of the floor panel 26, as a result of which the floor transceivers 36 which are formed from the coil 28 and the electronic circuit board 30 do not project from the rear side of the floor panel 26.

The blind holes 32 and the recesses 34 can be formed by milling or by drilling when floor panels 26 which are fabricated from gypsum fibers are used. The embodiment shown in FIGS. 3B and 3C, however, is just one example of a possible arrangement of the electronic circuit board 30 and an associated coil 28, and it is, for example, also possible to arrange both the electronic circuit board 30 and the coil 28 in a blind hole 32, as a result of which all that is necessary is to drill holes into the floor panels 26 in order to install the floor transceivers 36. In order to increase the distance between the individual floor transceivers 36 it is possible, in one exemplary embodiment, to have recourse to compound navigation or odometry. The information which is determined by compound navigation is used here for as long as the component tablets 18 within the transmitting/receiving surface 14 of the transceiver tablet 10 cannot detect any floor transceivers 36.

In the text which follows, the method of functioning and the interaction of the transceiver tablet 10 with the floor transceiver system, which is composed of a plurality of floor panels 26, will now be described.

In order to install the floor transceiver system within a space which can be, for example, a television studio, a plurality of floor panels 26 are laid, wherein the floor of the floor transceiver system can be configured as a hollow floor system, such as is generally known.

The modular design of the floor transceiver system from floor panels 26 which can be covered with plaster has the advantage that, in the case of a failure of individual components of the floor transceiver system, in each case individual floor panels 26 can be replaced without the complete floor system having to be replaced. In this context, the corresponding floor antennas 28 are newly calibrated after the floor panel 26 is replaced.

The floor transceivers 36 are arranged in the floor panel 26 in such a way that the coils 28 are arranged at regular intervals in the floor panel 26, wherein each coil or floor antenna 28 marks a corresponding position point within the floor panel 26 and therefore within the floor plane of the floor transceiver system. According to the invention, the floor transceivers 36 are embodied as transceivers, wherein the coil 28 operates as a transmitting antenna as well as a receiving antenna for picking up energy, as is used in RF-ID technology. The electronic circuit board 30 which is connected to the coil 28 can transmit its position within the floor plane to the transceiver tablet 10 here. However, it is not necessary for the electronic circuit board 30 to transmit all of the position data but rather the electronic circuit board 30 can in the simplest case transmit a uniquely defined floor transmitting/receiving identifier to the transceiver tablet 10, wherein all the relevant data relating to a floor transceiver 36 are stored in the corresponding component tablets 18 or in the evaluation electronics 16, which data can be retrieved using the uniquely defined floor transmitting/receiving identifier.

As is shown in FIG. 3C, the coil 28 is inserted into the blind hole 32 of the floor panel 26 in such a way that the winding axis of the coil 28 is located essentially perpendicularly with respect to the floor plane of the floor panel 26. It is therefore possible to form a quasi-punctiform floor antenna 28 within the plane of the floor on the basis of the irradiation direction and reception direction of the coil 28. The diameter of the coil 28 is approximately 1 mm here. The coil diameter of the coil 28 can, however, also be somewhat larger, that is to say approximately 5 mm or 10 mm. However, when fixed floor panels are used it is advantageous if the coil diameter of the coil 28 is kept small in order to be able to drill holes easily into a floor panel 26. The coil 28 is of cylindrical design and is approximately 20 mm long, wherein the distance between the end of the coil 28 and the surface of the floor panel 26, which corresponds approximately to the distance between the surface of the floor panel 26 and the end of the blind hole 32, is preferably less than 15 mm, particularly preferably less than 10 mm and, in particular, less than 5 mm, in order to achieve the smallest possible distance between the transceiver tablet 10 and the coil 28.

In another refinement of the invention which is not shown it is possible, however, for a coil of a floor transceiver to have a significantly larger diameter, that is to say approximately 50 mm to 150 mm, wherein the transmitting/receiving surface 14 of the transceiver tablet 10 correspondingly determines the center point of the coil. In this context the transceiver tablet 10 is configured in such a way that the correspondingly enlarged coil can be determined with the same precision with respect to its center point position. Since the correspondingly larger coil can be fabricated more thinly, said coil can be introduced into a PVC floor, which makes it possible to provide a floor which can be rolled out.

During the use of the localization system for determining the state of the device which can move along the plane of the floor according to the invention, the transceiver tablet 10 is moved over the floor plane of the floor transceiver system, which is composed of the plurality of floor panels 26. The spacer elements 12 are dimensioned here in such a way that the transmitting/receiving surfaces of the component tablets 18 as far as possible do not come into contact with the plane of the floor, in order to avoid abrasion of the transmitting/receiving surfaces of the component tablets 18 or scratching thereof. However, the spacer elements 12 are also selected in such a way that the distance between the transmitting/receiving surface of the component tablets 18 and the surface of the floor panels 26 is kept as small as possible. The average distance between the transmitting/receiving surface of the transceiver tablet 10 and the plane of the floor is preferably less than 15 mm, particularly preferably less than 10 mm and, in particular, less than 5 mm here.

The transmitting/receiving surface of a component tablet 18 is configured in such a way that the position of the coil 28, which is located opposite the transmitting/receiving surface of the component tablet 18 during operation of the localization system, can be localized within the transmitting/receiving surface of the component tablet 18. For this purpose, horizontally and vertically oriented antennas, which change over between a transmitting mode and a receiving mode, are arranged under the surface of the transmitting/receiving surface of the component tablet 18. This plurality of horizontally and vertically oriented antennas, which are each embodied as longitudinally extended induction loops, are arranged one on top of the other in two layers, with the result that an antenna grid is formed by the antennas which are arranged perpendicularly with respect to one another, which antenna grid is connected to evaluation electronics in order to be able to precisely determine the position of a coil 28 in the reception field within the plane of the tablet by evaluating the received transmission strength. The corresponding antennas of the transmitting/receiving surface output an electromagnetic signal which excites an oscillatory circuit, located in the transmission range, of a floor transceiver 36 which is formed from the coil 28 and a capacitor which is located in the electronic circuit board 30. A floor transceiver 36 can therefore be supplied with power via the oscillatory circuit. The activated electronic circuit board 30 then in turn outputs a signal via the coil to the antennas located opposite the respective coil 28 within the transmitting/receiving surface of a component tablet 18, wherein a position identifier or floor transceiver identifier can also be transferred during this RF communication between an antenna within the transmitting/receiving surface of the component tablet 18 and the coil 28.

In a simple embodiment of the invention, such as is shown in FIG. 2, a component tablet 18 is suitable for being able to unambiguously localize only one coil 28 of a floor transceiver 36 in each case. In this embodiment it is therefore advantageous if the floor antennas or coils 28 are arranged within the plane of the floor in such a way that in each case a coil 28 is located within a transmitting/receiving surface of a component tablet 18. In order to be able to unambiguously determine the attitude and position of the transceiver tablet 10, four component tablets 18 are therefore arranged within the transmitting/receiving surface 14 of the transceiver tablet 10 in this exemplary embodiment, wherein by virtue of the modular arrangement even dead zones located within the receiving surface 14 can also be compensated by the four component tablets 18 owing to the overlap of the four component tablets 18 in the different directions. Furthermore, owing to the use of four component tablets 18 it is also possible to compensate a failure of component tablets or floor transceivers.

Graphic tablets, which are known, for example, in the prior art, can be used as the component tablet 18, said graphic tablets having a resolution precision of approximately 1 mm, as a result of which a high-precision localization system for a movable device within a space is provided.

In the case of practical use, the localization system according to the invention can be connected to other localization systems, and it is therefore possible, for example, for the floor which is equipped with floor transceivers 36 to be provided only at specific locations in a space, at which locations precise determination of the positions is necessary, while in intermediate areas the position can be determined by means of compound navigation or odometry. In this context, the localization system according to the invention can also advantageously be used to correspondingly re-calibrate the travel sensors which are used in the case of odometry, since in the areas of the localization system according to the invention it is possible to determine the position and attitude of a movable device absolutely. It is therefore possible for a movable device, which can be a camera robot or an industrial robot, to span intermediate areas within a space by means of odometry.

When an industrial robot is used, it can be moved, by means of an actuation system which moves the robot, into areas which are equipped with the localization system according to the invention, wherein within these areas it is possible for inaccuracies in the adoption of a specific floor position to be easily compensated by movement of the camera robot arm. It is therefore possible for an industrial robot to be moved, for example, in front of a working area, wherein the accuracy of the adopted location does not have to be high. After this, the position is determined precisely in the plane of the floor by means of the localization system according to the invention, with accuracy in the millimeter range. This information is passed on to the industrial robot by means of a control device, as a result of which the industrial robot can move its hand or a mounted filming camera with millimeter precision to a predetermined position in the space of the working range. As a result, industrial robots can carry out different activities in different working areas and do not have to be trained anew, since they know the precise position of their location in every working area and can therefore move the robot's hand, which can be moved with millimeter precision, precisely to a position in the space.

For the configuration of the movable device there are a series of possibilities. For example, the movable device can be used as a transportation device in an autonomous stockkeeping system. In addition, it is conceivable to provide the movable device, which is equipped with a transceiver tablet, as a transportation robot or working robot in a biochemical laboratory, as a result of which a robot system is provided which is simultaneously highly precise and has a large range and, furthermore, can operate in a highly sterile environment. As a result it is possible for work, which in the past had to be carried out by people (in protective suits) owing to necessary precision, to be carried out by the robot system according to the invention. A further possible field of use is, for example, in transportation of or work with hazardous substances such as, for example, radioactive material, explosives or illness-inducing biological or chemical material.

A further application of the localization system according to the invention is, for example, the use of autonomous fabrication robots. In this context it is particularly advantageous that, owing to the contact-free localization by means of RF communication, both the floor transceiver system and the transceiver tablet can be encapsulated, wherein soiling by dust, oil or other dirt can be prevented, which makes fault-free operation possible.

The localization system according to the invention has a large number of advantages over the known positioning systems which are used, for example, in television studios for camera robots.

The localization system according to the invention therefore achieves a uniquely high level of positioning accuracy in the millimeter range, which cannot be achieved by RF-ID systems owing to the corresponding antenna size. Furthermore, the localization system of the invention is very durable since the floor panels 26 are resistant to dirt and abrasion. This is not the case in optical positioning systems which are known in the prior art. Furthermore, in the known localization systems it is virtually impossible to make repairs without completely replacing the floor system. In the system according to the invention, in which a large number of floor panels 26 are used, all that is necessary is to replace one respective defective floor panel and to re-calibrate the coils 28 located in the floor panel. Moreover, the localization system according to the invention makes it possible to achieve a high time resolution of less than 20 ms, which is often impossible with the known systems owing to the high computation expenditure by means of image processing. In contrast with known systems, there is also no need for installation on the roof or walls, as is the case, for example, in optical systems. The usually difficult calibration process of the optical targets within a space is therefore dispensed with. The floor transceiver system of the localization system of the present invention can, moreover, be adapted to the corresponding requirements by virtue of its unchanged surface, and it is therefore possible, for example, to continue to apply a specific color or specific floor markings without considering the corresponding localization system. Finally, the localization system operates in a contactless fashion, as a result of which there is no need to perform maintenance on corresponding components because of abrasion (apart from the spacer elements 12).

The invention claimed is:

1. A localization system for determining a state of a device that can move on a floor, comprising:
    a floor transceiver system having a plurality of floor transceivers which each have floor antennas for marking position points within the plane of the floor, and
    a transceiver tablet which is connected to the movable device and has a transmitting/-receiving surface which is located opposite the floor and is suitable for continuously determining the position points of at least two floor antennas within the transmitting/receiving surface simultaneously.

2. The localization system as claimed in claim 1, wherein a floor transceiver comprises the following:
    a coil which is embodied as a floor antenna and whose winding axis is located essentially perpendicularly with respect to the plane of the floor, and
    an electronic circuit board which is electrically connected to the coil and is designed for RF communication with the transceiver tablet.

3. The localization system as claimed in claim 2, wherein the electronic circuit board (30) is suitable for transmitting a position identifier to the transceiver tablet (10) during RF communication therewith.

4. The localization system as claimed in claim 2, wherein the coil of a floor transceiver has a diameter of less than 5 mm and, in particular, of less than 2 mm.

5. The localization system as claimed in claim 2, wherein the floor transceiver system has a plurality of floor panels, wherein the coils of the floor transceivers are each accommodated in rear-mounted blind holes of the floor panel in such a way that the distance between the surface of the floor and the end of the coil is less than 15 mm.

6. The localization system as claimed in claim 5, wherein the floor panel is made of gypsum fibers, wherein the blind holes are formed by drilling.

7. The localization system as claimed in claim 2, wherein the coil of a floor transceiver is embedded as a planar coil in a floor which can be rolled out.

8. The localization system as claimed in claim 1, wherein the average distance between the transmitting/receiving surface of the transceiver tablet and the plane of the floor is less than 15 mm.

9. The localization system as claimed in claim 1, wherein the transceiver tablet has spacer elements for keeping the transmitting/receiving surface of the transceiver tablet at a predetermined distance from the plane of the floor.

10. The localization system as claimed in claim 9, wherein the spacer elements are made of plastic.

11. The localization system as claimed in claim 1, wherein the transceiver tablet is composed of a plurality of component tablets for detecting, in each case, one position of a floor antenna of a floor transceiver, wherein the floor antennas of the floor transceivers are arranged in the plane of the floor in such a way that, at every position of the transceiver tablet, there is always a floor antenna in the detection range of a component tablet.

12. The localization system as claimed in claim 11, wherein the transceiver tablet has at least two component tablets.

13. The localization system as claimed in claim 1, wherein the movable device is a movable camera robot, an industrial robot or a camera stand.

14. The localization system as claimed in claim 1, wherein the movable device is a movable air cushion system with a robot for industrial use or with a camera robot.

15. The localization system as claimed in claim 5, wherein the distance between the surface of the floor and the end of the coil is less than 10 mm.

16. The localization system as claimed in claim 5, wherein the distance between the surface of the floor and the end of the coil is less than 5 mm.

17. The localization system as claimed in claim 8, wherein the average distance between the transmitting/receiving surface of the transceiver tablet and the plane of the floor is less than 10 mm.

18. The localization system as claimed in claim 8, wherein the average distance between the transmitting/receiving surface of the transceiver tablet and the plane of the floor is less than 5 mm.

* * * * *